United States Patent [19]

Armington et al.

[11] Patent Number: 4,806,410
[45] Date of Patent: Feb. 21, 1989

[54] PROCESSES FOR THE PRODUCTION OF ANTISTATIC OR STATIC DISSIPATIVE PAPER, AND THE PAPER PRODUCTS THUS PRODUCED, AND APPARATUS UTILIZED

[75] Inventors: Steven E. Armington, Kirtland, Ohio; Stephen A. Halperin, Elmhurst, Ill.; Gordon E. Pickett, Reynoldsburg; Barbara A. Metz, Baltimore, both of Ohio

[73] Assignee: Ranpak Corp., Willoughby, Ohio

[21] Appl. No.: 908,607

[22] Filed: Sep. 18, 1986

[51] Int. Cl.⁴ .................. B05D 3/02; B05D 5/12; B32B 3/04
[52] U.S. Cl. .................. 428/126; 162/138; 427/121; 427/391; 427/393.1; 428/537.5
[58] Field of Search ............. 162/138; 427/126, 365, 427/366, 391, 393.1; 428/922, 126, 511, 537.5

[56] References Cited

U.S. PATENT DOCUMENTS

| | | | |
|---|---|---|---|
| 2,106,039 | 1/1938 | Safford | 154/2.6 |
| 2,302,003 | 11/1942 | Cadwell et al. | 175/264 |
| 2,374,214 | 4/1945 | Kline et al. | 92/21 |
| 2,416,202 | 2/1947 | Naumann | 175/264 |
| 2,756,165 | 7/1956 | Lyon | 117/211 |
| 2,897,170 | 7/1959 | Gruber | 260/32.6 |
| 3,062,700 | 11/1962 | Dalton | 162/138 |
| 3,081,518 | 3/1963 | Carmody | 28/80 |
| 3,090,705 | 5/1963 | Miksits | 117/154 |
| 3,097,962 | 7/1963 | Whitacre et al. | 117/107 |
| 3,288,770 | 11/1966 | Butler | 260/88.3 |
| 3,316,178 | 4/1967 | Millington | 252/63.7 |
| 3,322,567 | 5/1967 | Shibe et al. | 117/121 |
| 3,366,533 | 1/1968 | Drake | 162/138 |
| 3,385,752 | 5/1968 | Selke et al. | 162/138 |
| 3,405,001 | 10/1968 | Iler | 117/121 |
| 3,446,651 | 5/1969 | Clachan et al. | 117/73 |
| 3,475,269 | 10/1969 | Cranford et al. | 162/138 |
| 3,480,847 | 11/1969 | Seweil et al. | 317/259 |
| 3,509,798 | 5/1970 | Johnson | 156/592 X |
| 3,532,800 | 10/1970 | Wyly et al. | 174/25 |
| 3,573,209 | 3/1971 | DeDryver et al. | 252/63 |
| 3,576,708 | 4/1971 | Breiner | 162/138 |
| 3,617,438 | 11/1971 | Nakao et al. | 162/138 |
| 3,650,954 | 3/1972 | Yasuda et al. | 252/63.2 |
| 3,655,500 | 4/1972 | Johnson | 229/14 X |
| 3,677,811 | 7/1972 | Kall | 106/244 X |
| 3,679,468 | 7/1972 | Feinauer et al. | 252/8.8 X |
| 3,682,696 | 8/1972 | Yasuda | 117/154 |
| 3,732,121 | 5/1973 | Long | 427/366 X |
| 3,736,178 | 5/1973 | Sadler et al. | 174/121 X |
| 3,764,376 | 10/1973 | Wagner et al. | 117/138.8 E |
| 3,769,060 | 10/1973 | Ida et al. | 117/37 R |
| 3,798,032 | 3/1974 | Miller | 162/138 X |
| 3,830,655 | 8/1974 | Rothwell et al. | 117/201 |
| 3,881,988 | 5/1975 | Yasuda | 162/181 A |
| 3,957,573 | 5/1976 | Miyamoto et al. | 162/102 |
| 3,991,256 | 11/1976 | Cornier et al. | 428/514 |
| 4,012,543 | 3/1977 | Ranger et al. | 427/366 X |
| 4,026,198 | 5/1977 | Ottaviano | 93/1 WZ |
| 4,034,375 | 7/1977 | Wallin | 428/110 X |
| 4,061,834 | 12/1977 | Hadek et al. | 428/522 |

(List continued on next page.)

OTHER PUBLICATIONS

Calgon Bulletin 28-6 entitled, Applying Conductive Polymer 261 to Pulp and Paper Products.
Calgon Bulletin 28-4 entitled, Conductive Polymer 261 LV.

Primary Examiner—Michael R. Lusignan
Attorney, Agent, or Firm—Baldwin, Egan & Fetzer

[57] ABSTRACT

Processes for the production of antistatic or static dissipative papers. The papers produced may be expeditiously used in dunnage converter machines operable to produce an antistatic (static dissipative) resilient pad-like cushioning dunnage product, for packaging and the like. In one of the processes, liquid antistatic material is applied to a still wet porous paper web produced on a Fourdrinier-type paper making machine, and in predetermined amount for impregnation therein, prior to the completion of the drying of the paper. In another process, a web of dry paper is impregnated with liquid antistatic material, and then the treated web is dried.

45 Claims, 2 Drawing Sheets

U.S. PATENT DOCUMENTS

| | | | |
|---|---|---|---|
| 4,104,175 | 8/1978 | Martinsson et al. | 252/8.57 |
| 4,111,920 | 9/1978 | Kunzel et al. | 526/6 |
| 4,115,334 | 9/1978 | Gerow | 428/348 X |
| 4,154,344 | 5/1979 | Yenni | 428/922 X |
| 4,160,503 | 7/1979 | Ohlback | 206/328 |
| 4,204,018 | 5/1980 | Bernstein et al. | 428/246 |
| 4,211,324 | 7/1980 | Ohlbach | 206/328 |
| 4,246,168 | 1/1981 | Sorenson | 428/407 X |
| 4,259,398 | 3/1981 | Seino et al. | 428/283 |
| 4,273,825 | 6/1981 | Nishiyama et al. | 428/223 |
| 4,293,070 | 10/1981 | Ohlbach | 206/328 |
| 4,294,882 | 10/1981 | Andrews et al. | 428/349 |
| 4,296,165 | 10/1981 | Kakar et al. | 428/264 |
| 4,307,144 | 12/1981 | Sanders et al. | 428/240 |
| 4,308,568 | 12/1981 | Whewell | 361/216 |
| 4,329,731 | 5/1982 | Meulenberg, Jr. | 361/218 |
| 4,391,952 | 7/1983 | Lybrand | 525/333.7 |
| 4,393,176 | 7/1983 | Lybrand | 525/379 |
| 4,400,441 | 8/1983 | Minnis et al. | 428/514 |
| 4,407,697 | 10/1983 | Sadler et al. | 162/137 |
| 4,407,872 | 10/1983 | Horii | 428/35 |
| 4,424,900 | 1/1984 | Petcavich | 206/328 |
| 4,471,872 | 9/1984 | Dedow | 206/328 |
| 4,480,747 | 11/1984 | Kazor et al. | 206/334 |
| 4,482,048 | 11/1984 | Blodgett | 206/328 |
| 4,496,406 | 1/1985 | Dedow | 156/66 |
| 4,519,873 | 5/1985 | Amano et al. | 162/138 |
| 4,528,222 | 7/1985 | Rzepecki et al. | 428/35 |
| 4,606,790 | 8/1986 | Youngs et al. | 162/138 X |

PROCESSES FOR THE PRODUCTION OF ANTISTATIC OR STATIC DISSIPATIVE PAPER, AND THE PAPER PRODUCTS THUS PRODUCED, AND APPARATUS UTILIZED

This invention relates in general to processes for the production of antistatic (or static dissipative as it will also be hereinafter referred to) papers for use as for instance, in dunnage converter machines operable to produce an antistatic or static dissipative resilient pad-like cushioning dunnage product, for use in packaging and the like, and relates to the antistatic or static dissipative papers resulting from said processes, and especially relates to processes for the production of static dissipative kraft papers for use in dunnage converters, and papers that meet certain electrical specifications at low relative humidity, so far as the surface resistivity and voltage decay time of the papers are concerned.

BACKGROUND OF THE INVENTION

Various antistatic or static dissipative papers are known in the prior art.

U.S. Pat. No. 3,405,001 issued Oct. 8, 1968 teaches a method of inhibiting the development of an electrostatic charge on solid materials, such as, for instance, paper or plastics, by the deposit on a solid material of a hydrocarbyl onium salt of a tetraarylboron, which results in a material having a reduced propensity for the development of an electrostatic charge thereon.

U.S. Pat. No. 3,682,696 issued Aug. 8, 1972 to Toshitaka Yasuda et al and entitled Method For Producing Antistatic Paper, discloses a method for producing antistatic paper utilizing a static electricity preventive agent which is insoluble or slightly soluble in water but is soluble in organic solvents, and has incorporated therein an antistatic amount of an inorganic powder insoluble in water, which inorganic powder is impregnated with an antistatic surface active agent insoluble or slightly soluble in water, but soluble in organic solvents.

U.S. Pat. No. 3,830,655 dated Aug. 20, 1974 in the name of Eric Rothwell, and entitled Conductive Papers, discloses electrically conductive paper made by coating or impregnating paper with a polymer containing quaternised dialkylamino methylene acrylamide or methacrylamide groups, and then curing the polymer. The process provides high resistance to water removal of conductivity, and the patent teaches that a variety of papers may be coated, including paperboard.

U.S. Pat. No. 3,881,988 issued May 6, 1975 to Toshitaka Yasuda and entitled Antistatic Paper, discloses an antistatic printing paper wherein the antistatic agent is caused to adsorb or adhere to the entirety or part of the filler of the paper in greater density than to the paper fibers, with the amount of antistatic agent being less than 5% based on the weight of the filler, with the amount of the filler being up to 30% by weight of the paper. This process and the resultant product relate in general to bleached printing paper.

U.S. Pat. No. 4,104,175 issued Aug. 1, 1978 to Eva Martinsson, and entitled Aqueous Solutions of Quaternary Ammonium Compounds, discloses compounds adapted to impart antistatic properties to substrates.

U.S. Pat. No. 4,154,344 issued May 15, 1979 to Donald M. Yenni, Jr. et al and entitled Material For Forming Envelopes Used to Protect Electronic Components, discloses sheet materials for forming envelopes for protecting electronic components and teaches a plural layer of polyester material to which has been added thereto antistatic material, and teaches that conventional antistatic materials useful for combining with polyethylene, include quaternary ammonium compounds.

SUMMARY OF THE INVENTION

The present invention provides novel processes for the production of static dissipative paper and especially static dissipative packaging paper for use, for instance, in dunnage converters, operable to produce a static dissipative, resilient, pad-like cushioning dunnage product for packaging and cushioning, and the like, and relates to the static dissipative papers produced by said processes, and which have predetermined electrical characteristics, namely a surface resistivity of between approximately $1 \times 10^5$ ohms per square and approximately $1 \times 10^{12}$ ohms per square at a relative humidity of no greater than approximately 15% or less and with a voltage decay time of approximately two seconds or less, upon grounding, at no greater than approximately 15% or less relative humidity, and from approximately 5,000 volts to technical zero voltage (i.e. approximately 50 volts). In one of the disclosed processes, a liquid antistatic material is applied to the still wet web of paper produced on a conventional Fourdrinier-type paper making machine, and in predetermined amount prior to accomplishing full drying of the paper. In another one of the disclosed processes, liquid antistatic material is applied to a web of dry paper taken from a roll thereof, and then passed through squeeze rollers, after which the web is dried and rerolled into roll form for subsequent use.

Accordingly, an object of the invention is to provide novel processes for the production of antistatic or static dissipative paper, and especially packaging paper adapted for use for instance in known paper dunnage converter machines, operable to produce an antistatic, resilient, pad-like, paper cushioning dunnage product, for packaging, cushioning and the like.

A still further object of the invention is to provide a process of the latter type wherein the antistatic material is applied to the wet or not fully dried web of paper formed on a conventional Fourdrinier-type paper making machine in predetermined amount per unit area of the wet paper web prior to continuing with the drying of the paper, after which the paper web is fully dried, resulting in a predetermined amount of antistatic material per unit area on the dried paper web.

A still further object of the invention is to provide a process of the aforementioned type wherein the resultant antistatic paper has a surface resistivity of between approximately $1 \times 10^5$ ohms per square and approximately $1 \times 10^{12}$ ohms per square at a relative humidity of no greater than approximately 15% or less, and with a voltage decay time of less than two seconds at no greater than approximately 15% or less relative humidity, from approximately 5,000 applied volts to technical zero volts.

A still further object of the invention is to provide an antistatic, kraft paper product for use in dunnage converter machines operable to produce an antistatic or static dissipative, resilient, pad-like cushioning dunnage product for packaging and the like, useful, for instance, in wrapping, and for protecting electronic components.

A still further object of the invention is to provide an antistatic or static dissipative paper product of the aforedescribed type which possesses a surface resistivity of between about $1 \times 10^5$ ohms per square to about $1 \times 10^{12}$ ohms per square at a relative humidity of no greater than approximately 15%, and with a voltage decay time of two seconds or less (preferably less) at no greater than approximately 15% relative humidity, and at an applied voltage of approximately 5,000 volts to a voltage of technical zero volts, upon grounding of the paper product.

Another object of the invention is to provide an arrangement of apparatus for mass producing antistatic or static dissipative papers, for various uses, and for instance, for use in packaging.

Other objects and advantages of the invention will be apparent from the following description taken in conjunction with the accompanying drawings wherein:

DESCRIPTION OF PREFERRED EMBODIMENT AND ALTERNATE EMBODIMENT

Referring now again to FIG. 1, there is diagrammatically disclosed a more or less conventional arrangement for the production of paper from pulp on the Fourdrinier wire section of a conventional paper making machine 10. Cleaned, washed, blended and/or mixed pulp having been made ready in the conventional manner is applied to the head box 12 of the paper making machine, from whence the pulp mixture, which is mostly water, is adapted to be then applied to the Fourdrinier wire section for removal of a substantial portion of the water from the pulp solution, in the process of forming paper. As the pulp and water flow onto the wire, the fibers of the pulp tend to form in the direction of flow. The Fourdrinier wire moves rapidly forward and is adapted to shake or vibrate from side to side, causing the pulp fibers to interlace with each other while the water falls through the wire mesh. The suction boxes on the underside of the wire assist in the removal of water from the pulp solution.

Figure 1:
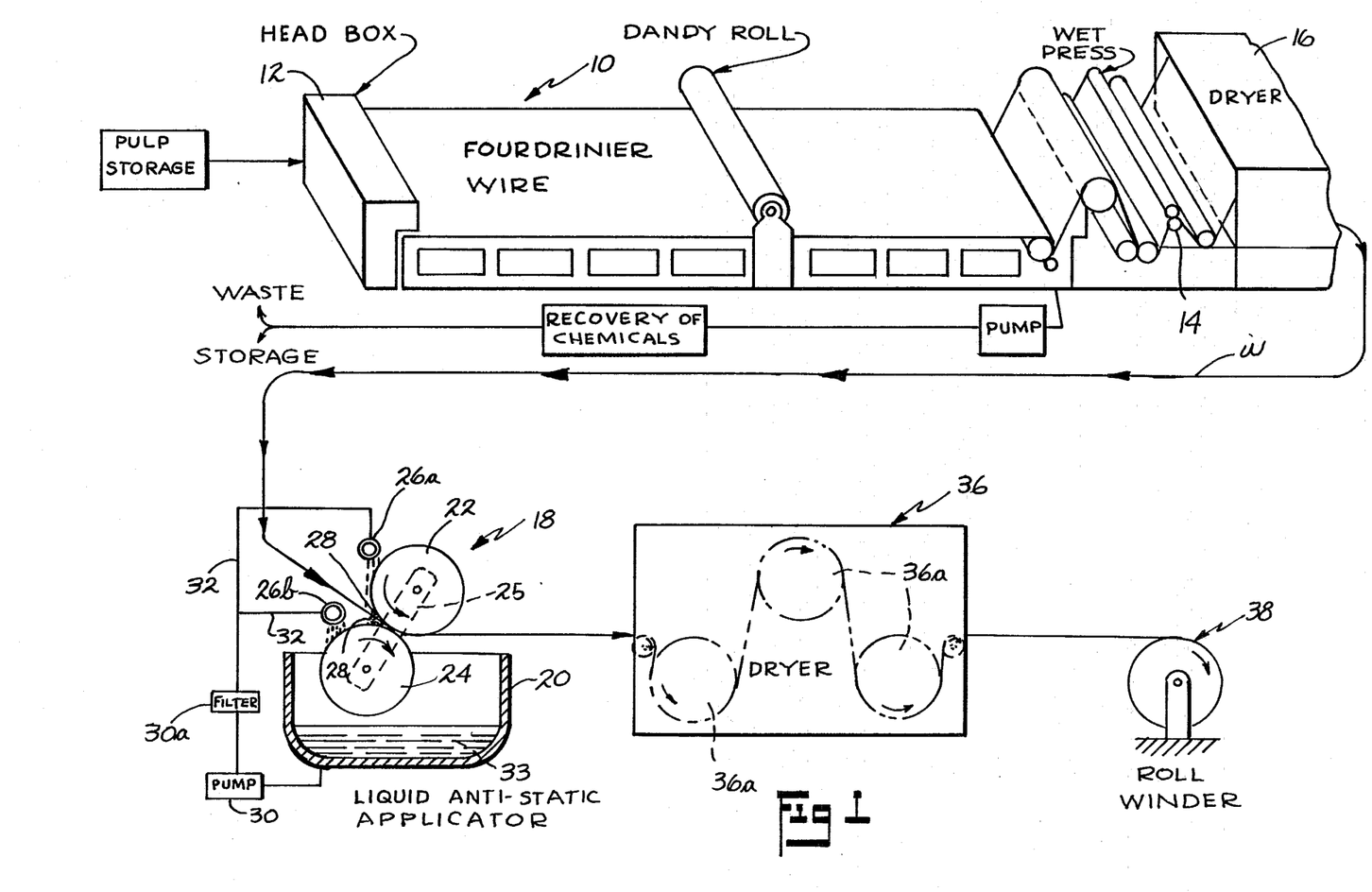
FIG. 1 is a generally diagrammatic illustration of a process for producing antistatic or static dissipative paper in accordance with the invention, and wherein liquid antistatic material is applied to a partially dried, but still wet paper web produced on a conventional Fourdrinier paper making machine, after which the paper web with the antistatic liquid applied thereto, is fully dried using conventional drier mechanism.

The pulp applied to the head box 12 may be unbleached virgin paper pulp, such as for instance urea formaldehyde treated unbleached virgin pulp, which is conventionally available and well known to those skilled in the kraft paper manufacturing art. However, it will be understood that other types of paper pulp, such as for instance bleached pulps, or recycled kraft paper pulp may also be used. However, virgin, high soft-wood content high wet strength pulp is generally preferred.

From the Fourdrinier wire section of the paper making machine, the web of interlocked pulp fiber and moisture may be passed through a conventional wet press section 14, on the machine and thence into a conventional drier section 16, where the web is adapted to be dried, to accomplish removal of a substantial portion of the water in the web and preferably to an extent that the web emitted from drier section 16 has approximately 5% to 10% by weight moisture content remaining, as compared to the approximate moisture content prior to passing through drier 16.

In accordance with the invention, this partially dried web w of paper emitted from drier section 16, is then passed to a liquid antistatic material applicator or feed mechanism 18, where liquid antistatic material is applied to the partially dried web of paper, and in a manner as will be hereinafter described.

Such liquid antistatic applicator mechanism 18 comprises in the embodiment illustrated, a container or receptacle 20 disposed below a pair of coacting power driven rollers 22, 24, between which the partially dried web w of paper from drier section 16 of the conventional paper making machine, is adapted to pass.

The power driven rollers 22, 24 are adapted to engage the web of paper at suitable pressure, such as for instance 30 p.s.i. gauge (which at the nip may be about 130 pounds per linear inch) and may be crowned rollers (crowned lengthwise of the respective roller) as is conventionally found in size applying apparatus utilized in conventional paper making machines. The coacting rollers 22, 24 may include conventional means 25 for adjusting the pressure therebetween, so as to properly roll the web as it passes therebetween.

Applicator mechanism 18 further comprises, in the embodiment illustrated, a pair of perforated antistatic liquid feed pipes 26a, 26b extending lengthwise of the coacting rollers 22, 24, and adapted to receive therein liquid antistatic material for applying the material by pressure and gravity, to the coacting and preferably horizontally offset rollers 22, 24 and thence to the web, so that as the partially dried web w of paper from drier section 16 passes between the engaged roller 22, 24, the antistatic liquid material is generally evenly and uniformly applied to both surfaces of the paper web w.

In this connection, it will be seen that the application of antistatic liquid to the rollers, and the rolling coaction of the rollers 22, 24, causes a pool 28 of the antistatic liquid to occur just upstream from the area of general engagement or nip of such rollers, so that the partially dried web w of paper is passed through this accumulated pool 28 of antistatic liquid produced by the feed applicator pipes 26a, 26b, thus helping to insure complete impregnation of the antistatic liquid into the paper web as it passes through rollers 22, 24. Passage of the web between the rollers 22, 24 causes any excess antistatic liquid to be squeezed from the paper web, and also encourages uniform wetting of the web as well as encouraging penetration or impregnation of the antistatic liquid into the web.

It will be understood that the paper web formed or produced on the paper making machine 10, utilizing for instance the aforementioned urea formaldehyde treated unbleached virgin pulp, results in a relatively porous type kraft paper, possessing a pre-treatment porosity as identified in the paper manufacturing art, of a densometer reading of about 5 to about 15 sec./100 ml as recorded on a Gurley densometer. In the process of FIG. 1, a densometer reading for the untreated paper of up to and including 25 sec./100 ml is readily permissible, but a reading of approximately 5 to approximately 15 seconds is preferred, and is believed to be optimum for production of the antistatic paper of the invention.

The receptacle 20 may be provided with a pump 30, a filter 30a, and conduit lines 32 leading to the aforementioned antistatic applicator pipe means 26a, 26b, for furnishing the antistatic liquid thereto from the supply 33 thereof in receptacle 20, with the pump pressure and gravity causing the antistatic liquid from pipes 26a, 26b to flow or stream downwardly onto the coacting rotating rollers 22, 24 (which in this embodiment of the invention may constitute steel rollers) and onto the web w. The web w, passing into the liquid antistatic applicator mechanism 18, has been dried in drier section 16 as aforementioned, to preferably about 5% to 10% moisture content, and together with the urea formaldehyde which has added substantial wet strength to the web w of paper, aids the handling of the paper web in its passage through the pool 28 of antistatic material in mechanism 18, and between the rollers 22, 24 thereof.

The antistatic liquid applied at mechanism 18 in the preferred embodiment, is a water soluble electroconductive quaternary ammonium polymer material known in the art as "Calgon" brand Conductive Polymer 261, or the equivalent. Reference may be had to U.S. Pat. No. 3,288,770 dated Nov. 29, 1966 in the name of George B. Butler and entitled Water Soluble Quaternary Ammonium Polymers, which is incorporated herein by reference, for a complete disclosure of this antistatic liquid material, the referred to patent setting forth numerous examples of the same (e.g. Example I—diallyldimethylammonium chloride polymer). In essence, such antistatic liquid is a water soluble quaternary ammonium polymer containing many ionic charged transfer and water holding sites, which makes it electroconductive. "Calgon" Polymer 261LV is purchaseable from Calgon Corporation of Pittsburgh, Pa., and is presently available in an aqueous solution of 40±1 weight percent solids, and having a viscosity of approximately 1000–3000 cps (Brookfield at 20 r.p.m.). The purchased solution possesses a specific gravity of approximately 1.085 grams per cubic centimeter @ 25° C., and is soluble in methanol, as well as in water.

The antistatic liquid is preferably heated in the receptacle 20 of apparatus 18 to a temperature of about 120° F. utilizing conventional controllable heating means (not shown) associated therewith, and can be applied in a solution presenting anywhere from approximately 4% solids by weight, to a solution presenting approximately 11% solids by weight, and even more, to produce antistatic paper via this process having the desired electrical characteristics. The higher the weight percentage of solids, of course, the more expensive is the cost of applying the antistatic material to the paper. Therefore, for most purposes, the aforementioned range of weight percent solids is preferred in order to meet an electrical specification providing for the finished paper, a surface resistivity in the range of approximately $1 \times 10^5$ ohms per square to approximately $1 \times 10^{12}$ ohms per square at a relative humidity of no greater than approximately 15% or less (at about 20°–25° C.), and a maximum voltage decay time of approximately two seconds or less at no greater than approximately 15% or less, relative humidity (at about 20°–25° C.) for approximately 5,000 applied volts to technical zero volts, upon grounding of said web. The actual EIA spec. for testing requires 48 hours conditioning at 12% Rh(±3%), at 70° F. (±6° F.), and testing at the same environment.

It is also desirable to meet a electrical specification of volume resistivity of less than $1 \times 10^{11}$ ohms-centimeter. Volume resistivity is the ratio of the DC voltage per unit of thickness applied across two electrodes in contact with the specimen to the amount of current per unit area passing through the system. Volume resistivity as aforementioned is generally given in ohms centimeters, and when using a concentric ring fixture, volume resistivity is calculated by using the expression volume resistivity =

$$\pi \frac{D1^2}{4T} \times R,$$

where D1 equals the diameter of the inner electrode or disc, R equals the measured resistance in ohms, and T equals the thickness of the specimen. The performance criteria for volume resistivity desired to be met is a paper having a volume resistivity of less than 1.0E+11 ohms-cm, and is measured in accordance with ASTM-D-257-78, or equivalent.

The following is a table, identified as Table No. 1, showing data accumulated in six trial runs on a Fourdrinier-type paper making machine as generally illustrated in FIG. 1, and showing for each of the runs (numbered 1 to 6, respectively) the pH, the weight percent solids in the antistatic liquid 33 at antistatic liquid applicator 18, and the viscosity at 120° F. in cps of the antistatic liquid utilized for each run, illustrating the viscosity for each of the runs at 60 rpm, at 30 rpm, and at 12 rpm when utilizing a Brookfield LVT viscosity meter with Spindle No. SC4-18.

TABLE NO. 1

| | Antistatic Liquid Measured Data | | | |
|---|---|---|---|---|
| | | | Viscosity at 120° F., cps | |
| Run No. | pH | Weight % Solids | 60 RPM | 30 RPM | 12 RPM |
| 1 | 6.1 | 11.2% | 12.6 | 14.5 | 21.8 |
| 2 | 6.4 | 7.3% | 8.6 | 10.7 | 18.2 |
| 3 | 6.4 | 6.2% | 7.4 | 9.5 | 16.8 |
| 4 | 6.5 | 4.9% | 6.2 | 8.4 | 13.8 |
| 5 | 6.6 | 3.1% | 5.0 | 6.9 | 12.0 |
| 6 | 6.7 | 1.7% | 4.2 | 6.2 | 10.0 |

Also, shown is a table identified as following Table No. 2 illustrating the aforementioned six trial runs of paper showing measured weight percent solids in the antistatic liquid at the antistatic liquid applicator mechanism 18, the measured pick-up of antistatic liquid in gallons per hour, the calculated dry pounds of antistatic material per hour applied to the paper web, and the calculated pick-up of antistatic solids in weight percent, and in pounds per ream of paper.

TABLE NO. 2

| Run No. | Basis Weight (1) lb/rm | Moisture Weight % (2) | Production Rate (3) lbs of paper hr | Antistatic Solution Solids Pickup (4) | | Dry lbs/hr (calculated) | Calculated Conductive Polymer Pickup-Solids (5) | |
|---|---|---|---|---|---|---|---|---|
| | | | | Weight % | Gal/hr | | Percent | lbs/rm |
| 1 | 33.4 | 4.98 | 7316 | 11.15 | 900 | 857 | 11.7 | 3.9 |
| 2 | 31.7 | 4.96 | 6868 | 7.32 | 702 | 435 | 6.3 | 2.0 |
| 3 | 32.2 | 4.80 | 6946 | 6.25 | 606 | 320 | 4.7 | 1.5 |
| 4 | 29.8 | 5.00 | 6409 | 4.91 | 600 | 248 | 3.9 | 1.2 |
| 5 | 29.3 | 5.04 | 6299 | 3.13 | 633 | 166 | 2.6 | 0.8 |
| 6 | 29.2 | 5.01 | 6272 | 1.66 | 570 | 79 | 1.3 | 0.4 |

Notes:
(1) Treated basis weight at designated moisture from Measurex (computer) data.
(2) Reel average moisture from Measurex data.
(3) Production data for actual trim at reel and actual average treated basis weight and machine speed.
(4) Based upon measuring actual volume pickup and measured solids of respective antistatic solutions.
(5) Calculated antistatic content using data in preceding columns.

It will be seen that the pounds per ream (3000 ft.$^2$) of antistatic polymer applied to the six trial runs varied from approximately 0.4 for run No. 6 to approximately 3.9 pounds per ream for run No. 1, and the measured weight percent of solids in the antistatic liquid 33 at mechanism 18 varied from approximately 1.66% for the sixth run, to approximately 11.15% for the first run.

The web of paper was moving at approximately 1400 feet per minute through the antistatic applicator mechanism 18, and thence into the drier mechanism 36 where steam heated drum-type driers therein were maintained at temperatures within the range of approximately 240° F. to 260° F., which appeared adequate to dry the coated and impregnated web of paper, after which it was wound on roll winder 38 for subsequent handling. The treated paper web in drier section 36, moving as aforementioned at approximately 1400 feet per minute, was in engagement with the heated drums 36a of the drier section 36 for a relatively short time (e.g. up to three minutes), which appeared to be adequate for drying the remaining moisture and liquid antistatic material onto the web, resulting in the moisture percentages listed in Table No. 2 for the finished paper for each of six runs.

The following identified Table No. 3 lists the aforementioned six trial runs and specifies the average decay time (in seconds), for each run, the average top surface resistivity, the average bottom surface resistivity, and the average surface resistivity (in ohms per square) and the average corrected volume resistivity (in ohm-cm and in ohm-cm/mm) for each of the papers produced on the aforementioned six trial runs.

TABLE NO. 3

| Trial No. | Sample Thickness | Average Decay (Seconds) | Average Top Surface Resist. Correct. ASTM 257 (Ohm/sq) | Average Bottom Surface Resist. Correct. ASTM 257 (Ohm/sq) | Average Surface Resist. Correct. ASTM 257 (Ohm/sq) | Average Corrected Volume Resistivity | |
|---|---|---|---|---|---|---|---|
| | | | | | | Ohm-cm | Ohm-cm/mm |
| 1 | .09 mm .01 cm | 0.02 | 2.4E + 09 | 2.3E + 09 | 2.3E + 09 | 4.2E + 10 | 4.8E + 11 |
| 2 | .09 mm .01 cm | 0.08 | 1.4E + 10 | 1.4E + 10 | 1.4E + 10 | 9.6E + 10 | 1.1E + 12 |
| 3 | .09 mm .01 cm | 0.20 | 3.4E + 10 | 3.1E + 10 | 3.2E + 10 | 2.4E + 11 | 2.6E + 12 |
| 4 | .09 mm .01 cm | 1.05 | 1.7E + 11 | 1.6E + 11 | 1.7E + 11 | 1.0E + 12 | 1.1E + 13 |
| 5 | .09 mm .01 cm | 3.56 | 5.6E + 11 | 5.6E + 11 | 5.6E + 11 | 4.3E + 12 | 4.8E + 13 |
| 6 | .09 mm .01 cm | 23.13 | 3.9E + 12 | 3.2E + 12 | 3.5E + 12 | 2.1E + 13 | 2.3E + 14 |
| Avg. | .09 mm .01 cm | 4.67 | 7.7E + 11 | 6.6E + 11 | 7.2E + 11 | 4.5E + 12 | 5.0E + 13 |

Note:
Tests conducted at relative humidity of 11.9% (±3%) and at a temperature of approximately 68.8° F.

It will be noted from Table No. 3 that trials 1 through 4 fully meet the decay times and the surface resistivity requirements of the aforementioned desired electrical specifications, while trial run Nos. 1 and 2 comply with the EIA (Electronic Industries Association) recommendations for static dissipative material that is both surface and volume functional. Trial runs 5 and 6 did not result in paper complying with the stated electrical specifications, but still resulted in paper having some antistatic paper characteristics (and especially the paper of run No. 5). The paper of run No. 6 could be classified as a paper having more insulative type electrical characteristics rather than "antistatic" type characteristics, although static discharge suppression was noted during paper manufacture even with the paper from run No. 6.

Thus, it will be seen that in these six trial runs of paper produced on a conventional paper making machine of the Fourdrinier wire type, and with antistatic liquid material Polymer 261 applied as indicated in aforediscussed Table No. 1 between the range of approximately 4.9 weight percent to approximately 11.2 weight percent solids in source 33, and at a temperature of the antistatic liquid of approximately 120° F., produced antistatic or static dissipative papers which meet desired electrical specification requirements of an antistatic or static dissipative paper having a surface resistivity in the range of approximately $1 \times 10^5$ ohms per square to approximately $1 \times 10^{12}$ ohms per square at a relative humidity of no greater than approximately 15% or less, (at a temperature of approximately 20°-25° C.) and a paper having a maximum decay voltage time of less than two seconds at no greater than approximately 15% relative humidity or less, for approximately 5,000 applied volts to technical zero volts, upon grounding of the coated web, and as illustrated in Table No. 3.

While "Calgon" antistatic conductive Polymer 261 or equivalent, has been identified as a preferred polymer material, it will be understood that there are other liquid antistatic materials that could also be utilized in generally the same ratios as the specified material. One other such material is known as "Versa-TL" polymer which is a water soluble polystyrene sulfonic acid (PSSA) and which can be utilized in the FIG. 1 process and in approximately the same amounts as the aforediscussed "Calgon" 261, and resulting in approximately the same coating weights for the produced paper. "Versa-TL" polymer is obtainable from the National Starch & Chemical Corp. of Bridgewater, N.J.

Also a commercially available product known as "Staticide" antistatic liquid, obtainable from the Analytical Chemical Laboratories of Elk Grove Village, Chicago, Ill. could be utilized in the amounts and manner hereinafter set forth. Such "Staticide" antistatic material is an electroconductive combination of ammonium or other inorganic salts and surfactants, is water soluble, dries clear, and has been found by applicants suitable for use on paper material to produce antistatic paper, and as will be hereinafter described.

Figure 2:
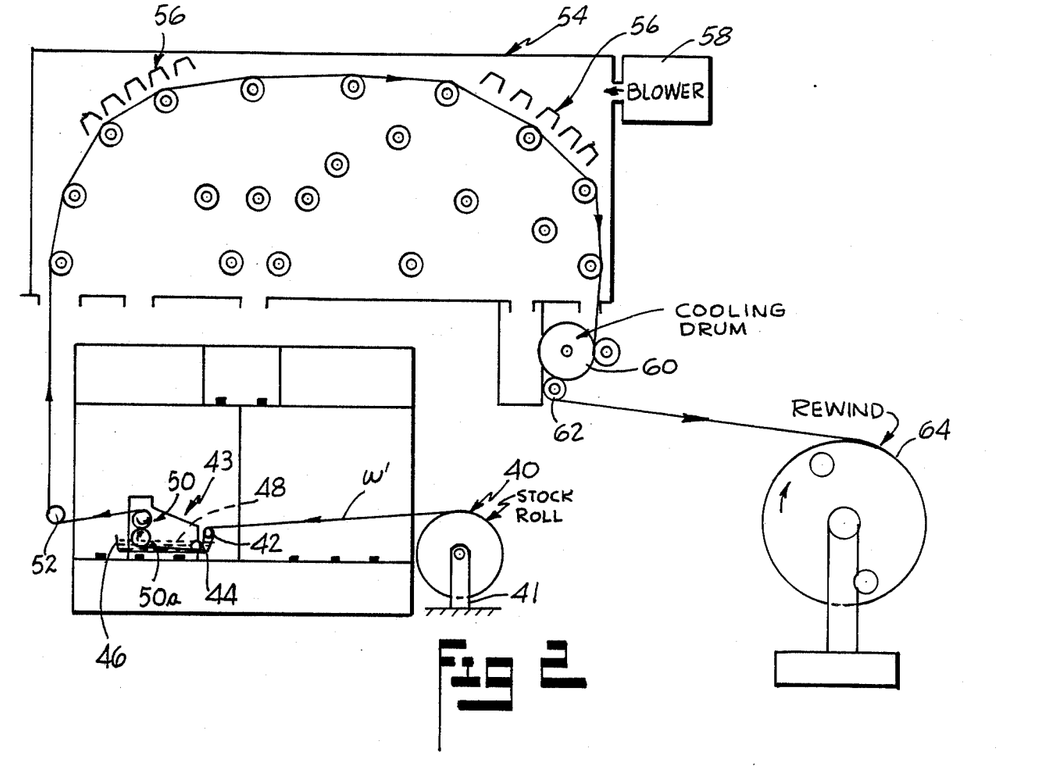
FIG. 2 is a generally diagrammatic illustration of an alternate process for producing antistatic or static dissipative paper wherein a web of dry paper is taken from a roll thereof and passed through a pool or bath of antistatic liquid, and then passed through squeeze rollers, for uniformly applying and impregnating the antistatic liquid into the paper and to remove the excess thereof, after which the web is passed through a drier, for drying the antistatic liquid on the paper web, after which the latter is rerolled into roll form, for subsequent use.

Referring now to FIG. 2, there is shown another embodiment of process for treating paper material with antistatic liquid, to provide an antistatic or static dissipative paper.

In this other embodiment, a stock roll 40 of dry paper is rotatably mounted on a support 41 from which the web w' of paper is drawn and which then passes over an idler roller 42 and to antistatic liquid applying mechanism 43, comprising preferably a further idler roller 44, disposed in a receptacle 46, which contains a pool or bath 48 of antistatic liquid material at ambient temperature, such as for instance the aforementioned "Calgon" antistatic liquid. The paper for roll 40 is porous, and may possess a densometer reading of the same general nature as that described in connection with FIG. 1, but in any event preferably has a Gurley densometer reading of less than about 25 sec./100 ml for use in the process of the type of FIG. 2.

The paper web w' passes through the pool 48 of antistatic liquid and is treated on both sides thereof by the antistatic liquid, and then the web passes up about and between the squeeze rollers 50, 50a of mechanism 43, where excess liquid is removed from the paper web by the rollers, and then the paper is passed about idler roller 52, and then up into drier mechanism 54, where (in the embodiment illustrated) infrared drier units 56 thereof dry the antistatic liquid coating and impregnating material on the web of paper. The aforementioned squeeze rollers 50, 50a can be a coating steel roller and a coating rubber roller, for enabling good contact therebetween and effective removal of excess antistatic liquid from the paper web. Any excess liquid is carried back down into the pool or bath of antistatic liquid by roller 50a. The rollers 50, 50a preferably have conventional means (not shown) for adjusting the pressure therebetween, with the rollers preferably applying approximately 60 p.s.i. pressure to the paper web as it passes therethrough.

The web w' may be moved through the antistatic liquid applying mechanism 43 at any suitable speed, which in the embodiment illustrated was a speed of approximately 50 feet per minute, while the drier 54 may be operated at suitable temperature, which in this embodiment was approximately 100° C., which is effective to dry the coated web of paper with the antistatic liquid thereon. The drier mechanism may include a blower 58 which in the embodiment illustrated is adaptable for moving the heated air through the drier at a velocity of approximately, for instance, 3700 feet per minute. From the drier 54 the dried and impregnated paper web is adapted to move past a cooling drum 60, and thence about idler roller 62 to rewind spool 64, where the dried web impregnated with antistatic material, is rewound into roll form, for subsequent use.

It will be seen therefore that in this FIG. 2 embodiment, the antistatic liquid material is applied by applicator mechanism 43, to a web of paper which has been previously produced on a paper making machine.

Following Table No. 4 lists the electrical characteristics of various commercially available kraft papers to which was applied by the aforediscussed FIG. 2 type process mechanism, "Calgon" antistatic liquid in the amount of 10 weight percent total solids, with water as the carrier in one instance, and 50:50 water alcohol as the carrier in the other instance. The respective kraft paper utilized in stock roll 40, has been designated by its source name, and the porosity of each of the finished antistatic or static dissipative papers (after completion of the antistatic application and drying thereof) has been listed in both Bendtsen measurements and in calculated Gurley densometer values. It will be noted that all of such antistatic (or static dissipative papers) meet the aforediscussed desired electrical specifications for static decay and for surface resistivity.

TABLE NO. 4

EFFECTS OF PAPER STOCK AND CARRIER SOLVENT SYSTEM ON POROSITY AND ELECTRICAL PROPERTIES
Machine Coated Utilizing 10 Wt. % "Calgon"

| Type Kraft Paper | Carrier | Average (Measured) Coat Wt. (lbs/rm) | Porosity (Bendtsen/Gurley) | Static Decay (Sec) | Surface Resistivity ohms/sq |
|---|---|---|---|---|---|
| Old Longview Virgin | Water | 1.73 | 569/10 | .26 | $2.61 \times 10^{11}$ |
| Old Longview Virgin | 50:50 Water/MeOH | 2.27 | 487/12 | .06 | $1.15 \times 10^{11}$ |
| New Longview Virgin | Water | 2.34 | 170/35 | .07 | $1.06 \times 10^{11}$ |
| New Longview | 50:50 Water/MeOH | 2.31 | 240/25 | .03 | $8.52 \times 10^{10}$ |

TABLE NO. 4-continued
EFFECTS OF PAPER STOCK AND CARRIER SOLVENT SYSTEM ON POROSITY AND ELECTRICAL PROPERTIES
Machine Coated Utilizing 10 Wt. % "Calgon"

| Type Kraft Paper | Carrier | Average (Measured) Coat Wt. (lbs/rm) | Porosity (Bendtsen/Gurley) | Static Decay (Sec) | Surface Resistivity ohms/sq |
|---|---|---|---|---|---|
| Virgin Mosinee M-2314 | Water | 2.85 | 344/17 | .06 | $1.34 \times 10^{11}$ |
| Mosinee M-2314 | 50:50 Water/MeOH | 2.80 | 336/18 | .04 | $1.01 \times 10^{11}$ |

The following Tables, No. 5 and No. 6, illustrate test results on various porous kraft papers (both virgin and recycled kraft) utilizing aforediscussed antistatic liquid materials in the coat weights (pounds per ream) indicated, and showing long term surface resistivity and static decay results, with such antistatic or static dissipative papers having been produced utilizing the FIG. 2 type process and apparatus. It will be noted that the surface resistivity tests, as indicated, were performed at the 100 volt criteria, which typically produces higher surface resistivity values than the more common 500 volt criteria as utilized when measuring the surface resistivity in accordance with ASTM-D-257-78 or equivalent. The static decay tests were run in accordance with the requirements imposed by MIL-B-81705B using in general Federal Test Standard 101C, Method 4046.1 as a reference, or the equivalent thereof, the intent being to determine the test specimens ability to dissipate 99% of a 5KV charge to ground within a specified time period (i.e. less than two seconds). It will be noted that for these produced papers, the carrier utilized was 50:50 water:methanol.

TABLE NO. 5
LONG-TERM SURFACE RESISTIVITY RESULTS

| Type Coating | Type Kraft Paper | Target Coat Weight (lbs/3000 ft²) | Time After Coating | | | |
|---|---|---|---|---|---|---|
| | | | 3-Months | 4-Months | 5-Months | 6-Months |
| Calgon + | Virgin | 1.80 | $2.82 \times 10^{11}$ | $1.21 \times 10^{11}$ | $9.10 \times 10^{11}$ | $2.29 \times 10^{11}$ |
| Calgon + | Recycled | 1.80 | $1.14 \times 10^{12}$ | $4.65 \times 10^{11}$ | $4.04 \times 10^{12}$ | $8.83 \times 10^{11}$ |
| Calgon + | Virgin | 0.90 | $1.79 \times 10^{12}$ | $4.77 \times 10^{11}$ | $4.38 \times 10^{12}$ | $1.46 \times 10^{12}$ |
| Versa TL + | Virgin | 1.80 | $1.17 \times 10^{12}$ | $4.92 \times 10^{11}$ | $6.74 \times 10^{12}$ | $1.02 \times 10^{12}$ |
| Staticide | Virgin | 0.75 | $7.54 \times 10^{10}$ | $9.17 \times 10^{10}$ | $9.36 \times 10^{10}$ | $1.28 \times 10^{11}$ |
| Staticide | Recycled | 0.75 | $1.16 \times 10^{11}$ | $1.23 \times 10^{11}$ | $1.82 \times 10^{11}$ | $1.67 \times 10^{11}$ |
| Staticide | Virgin | 0.25 | $1.71 \times 10^{13}$ | $2.41 \times 10^{13}$ | $5.59 \times 10^{13}$ | $5.72 \times 10^{13}$ |
| Staticide | Recycled | 0.25 | $2.88 \times 10^{13}$ | $1.13 \times 10^{14}$ | $3.99 \times 10^{14}$ | * |

*DID NOT TEST
TESTED AT 100 VOLTS
SPECIFICATION REQUIREMENT: $<1.00 \times 10^{12}$
+ COATINGS PREPARED IN 50/50 WATER/METHANOL - COATED 2-SIDES

TABLE NO. 6
LONG-TERM STATIC DECAY RESULTS

| Type Coating | Type Kraft Paper | Target Coat Weight (lbs/3000 ft²) | Time After Coating | | | |
|---|---|---|---|---|---|---|
| | | | 3-Months | 4-Months | 5-Months | 6-Months |
| Calgon + | Virgin | 1.80 | 0.07 | 0.04 | 0.10 | 0.11 |
| Calgon + | Recycled | 1.80 | 0.47 | 0.22 | 0.70 | 0.70 |
| Calgon + | Virgin | 0.90 | 0.46 | 0.21 | 0.54 | 0.92 |
| Versa TL + | Virgin | 1.80 | 0.12 | 0.07 | 0.23 | 0.21 |
| Staticide | Virgin | 0.75 | 0.01 | 0.01 | 0.01 | 0.02 |
| Staticide | Recycled | 0.75 | 0.02 | 0.02 | 0.02 | 0.02 |
| Staticide | Virgin | 0.25 | 3.92 | 3.81 | >12.00 | 9.80 |
| Staticide | Recycled | 0.25 | 6.11 | >15.00 | * | * |

*DID NOT TEST
SPECIFICTION REQUIREMENTS: <2.00 SECONDS
+ COATINGS PREPARED IN 50/50 WATER/METHANOL - COATED 2-SIDES

Following Table No. 7 discloses test results of static decay and surface resistivity for papers produced by the FIG. 2 type process and apparatus and which were subjected to accelerated aging thereof, by placing the paper in an environment of 160° F. temperature for a period of 20 days (after the samples were already six months old). Such an accelerated aging technique represents in general three to six months time of conventional aging.

TABLE NO. 7
EXPERIMENTAL RESULTS FOR ACCELERATED AGING OF MACHINE COATED PAPER

| Type Coating | Type Kraft Paper | Target Coat Weight (lbs/3000 ft²) | Static Decay In Sec. | | Surface Resistivity ohms/sq | |
|---|---|---|---|---|---|---|
| | | | Initial | Aged | Initial | Aged |
| Calgon* | Virgin | 1.80 | .06 | .05 | $2.25 \times 10^{11}$ | $6.28 \times 10^{11}$ |

TABLE NO. 7-continued
EXPERIMENTAL RESULTS FOR ACCELERATED AGING OF MACHINE COATED PAPER

| Type Coating | Type Kraft Paper | Target Coat Weight (lbs/3000 ft²) | Static Decay In Sec. Initial | Static Decay In Sec. Aged | Surface Resistivity ohms/sq Initial | Surface Resistivity ohms/sq Aged |
|---|---|---|---|---|---|---|
| Calgon* | Recycled | 1.80 | .32 | .66 | $9.34 \times 10^{11}$ | $5.74 \times 10^{12}$ |
| Calgon* | Virgin | 0.90 | .38 | .65 | $1.30 \times 10^{12}$ | $8.61 \times 10^{12}$ |
| Versa TL* | Virgin | 1.80 | .11 | 1.00 | $4.90 \times 10^{11}$ | $2.22 \times 10^{13}$ |
| Staticide | Virgin | 0.75 | .01 | .05 | $6.98 \times 10^{10}$ | $2.04 \times 10^{11}$ |
| Staticide | Recycled | 0.75 | .02 | 1.36 | $1.24 \times 10^{11}$ | $1.58 \times 10^{12}$ |

AGED 20 DAYS AT 160° F.
SAMPLES WERE 6-MONTHS OLD WHEN AGING WAS INITIATED
*COATINGS WERE PREPARED IN 50/50 WATER/METHANOL - COATED 2-SIDES
TESTED AT 100 VOLTS FOR SURFACE RESISTIVITY

The following Table No. 8 discloses test results of electrical specifications for machine coated papers produced by the FIG. 2 process and apparatus when "Calgon" antistatic liquid material was mixed with certain modifiers for paper, in the weight ratios indicated. As can be readily seen, the modifiers would be expected to reduce the porosity of the paper and the combination seems to result in an increase of the surface resistivity of each of the coated papers.

The following Table No. 9 discloses electrical specification test results for 10% "Calgon" antistatic solution and various further modifiers in the weight ratios specified, and Table No. 10 lists the same test results for 10% "Versa TL" antistatic solution and for the same modifiers as those in Table No. 9, for hand coated, porous paper specimens, which were coated on only one side thereof. As can be seen, certain of the modifier-antistatic liquid combinations resulted in non-satisfactory

TABLE NO. 8
EXPERIMENTAL RESULTS FOR MACHINE COATED KRAFT PAPERS
(10% "CALGON", ANTISTATIC SOLUTION AND SELECTED MODIFIERS)

| Modifier | Wt. % Ratio "Calgon" to Modifier | Total Solids (PPH) | Average Measured Coat Weight (lbs/3000 ft²) | Viscosity (CPS) | Static Decay (SEC) | Surface Resistivity ohms/sq |
|---|---|---|---|---|---|---|
| None (10% Calgon) | 0% | 10 | 2.1 | | .35 | $3.35 \times 10^{12}$ |
| Penford Gum | 1:1 | 18 | 4.1 | | 2.40 | $1.54 \times 10^{14}$ |
| Penford Gum (Pennick & Ford Ltd.- Cedar Rapids, Iowa) | 9:1 | 11 | 2.5 | | .63 | $1.65 \times 10^{13}$ |
| Superfilm (Cargill- Cedar Rapids, Iowa) | 9:1 | 11 | 2.6 | | .76 | $1.67 \times 10^{13}$ |
| Superfilm/Kelgin | 1:1 | 18 | 4.5 | | 4.31 | $1.23 \times 10^{14}$ |
| Superfilm/Kelgin | 9:1 | 11 | 2.7 | | .54 | $1.79 \times 10^{13}$ |
| Kelgin (Kelco- Rahway, New Jersey) | 40:1 | 10 | 2.5 | | .44 | $8.65 \times 10^{12}$ |
| Vinol | 9:1 | 11 | 2.7 | | .56 | $9.36 \times 10^{12}$ |

COATINGS PREPARED IN ALL WATER SYSTEMS - COATED 2-SIDES
TESTED AT 100 VOLTS FOR SURFACE RESISTIVITY

It is of course well known to size papers with various materials, such as starch and rosins, to improve its surface characteristics, and their resistance to grease, oil and water.

surface resistivity and static decay performance for certain of the test specimens, so far as meeting the aforediscussed desired electrical specifications for the paper are concerned.

TABLE NO. 9
EXPERIMENTAL RESULTS FOR HAND-COATED KRAFT PAPER
(10% "CALGON", ANTISTATIC PLUS VARIOUS MODIFIERS)

| Modifier | Wt. Ratio "Calgon" to Modifier | Total Solids (PPH) | Average Measured Coat Weight (lbs/3000 ft²) | Viscosity (CPS) | Static Decay (SEC) | Surface Resistivity ohms/sq |
|---|---|---|---|---|---|---|
| None (10% Calgon) | 0% | 10 | 2.8 | 32 | .03 | $3.77 \times 10^{10}$ |
| QR-708 - acrylic modifier - (Rohm & Hass- Phildelphia, Pennsylvania) | 9:1 | 11 | 2.6 | 168 | .20 | $2.32 \times 10^{11}$ |
| CMC - carboxymethyl cellulose | 1:1 | 20 | 3.6 | 7140 | 4.06 | $5.61 \times 10^{12}$ |
| CMC - carboxymethyl cellulose | 9:1 | 11 | 2.4 | 88 | .09 | $8.46 \times 10^{10}$ |
| Starch - cationic modified | 1:1 | 20 | 2.4 | 162 | .06 | $8.15 \times 10^{10}$ |
| Starch - cationic modified | 9:1 | 11 | 2.2 | 58 | .04 | $3.91 \times 10^{10}$ |
| Vinol - polyvinyl alcohol | 4:1 | 12 | 2.4 | 134 | .03 | $4.16 \times 10^{10}$ |
| Vinol - polyvinyl alcohol (Air Products Vinol 125- | 9:1 | 11 | 2.6 | 77 | .02 | $3.05 \times 10^{10}$ |

TABLE NO. 9-continued
EXPERIMENTAL RESULTS FOR HAND-COATED KRAFT PAPER
(10% "CALGON", ANTISTATIC PLUS VARIOUS MODIFIERS)

| Modifier | Wt. Ratio "Calgon" to Modifier | Total Solids (PPH) | Average Measured Coat Weight (lbs/3000 ft$^2$) | Viscosity (CPS) | Static Decay (SEC) | Surface Resistivity ohms/sq |
|---|---|---|---|---|---|---|
| Allentown, Pennsylvania) | | | | | | |
| Polyhall 195 - high molecular wt. polyacrylamide | 9:.02 | 10 | 2.8 | 86 | .02 | $2.48 \times 10^{10}$ |
| Polyhall 195 - high molecular wt. polyacrylamide (Stein Hall Co.) | 9:.01 | 10 | 2.2 | 61 | .03 | $3.78 \times 10^{10}$ |
| Starch | 1:1 | 20 | 4.8 | 162 | .01 | $1.75 \times 10^{10}$ |

COATINGS PREPARED IN ALL WATER SYSTEMS - COATED 1-SIDE
KRAFT PAPER UTILIZED WAS "LONGVIEW" KRAFT
TESTED AT 100 VOLTS FOR SURFACE RESISTIVITY

TABLE NO. 10
EXPERIMENTAL RESULTS FOR HAND-COATED KRAFT PAPER
(10% "VERSA TL", ANTISTATIC PLUS VARIOUS MODIFIERS)

| Modifier | Wt. Ratio "Versa TL" to Modifier | Total Solids (PPH) | Average Measured Coat Weight (lbs/3000 ft$^2$) | Viscosity (CPS) | Static Decay (SEC) | Surface Resistivity ohms/sq |
|---|---|---|---|---|---|---|
| None (10% Versa TL) | 0% | 10 | 3.0 | 36 | .08 | $1.47 \times 10^{11}$ |
| QR-708 | 9:1 | 11 | 3.0 | 210 | 2.07 | $5.06 \times 10^{12}$ |
| CMC | 1:1 | 20 | 3.3 | 705 | .99 | $1.73 \times 10^{12}$ |
| CMC | 9:1 | 11 | 2.9 | 50 | .06 | $1.50 \times 10^{11}$ |
| Starch | 1:1 | 20 | 3.3 | 1634 | .30 | $8.35 \times 10^{11}$ |
| Starch | 9:1 | 11 | 3.4 | 73 | .05 | $1.16 \times 10^{11}$ |
| Vinol | 3:1 | 10 | 2.4 | 184 | 13.27 | $3.67 \times 10^{13}$ |
| Vinol | 9:1 | 11 | 2.6 | 94 | .08 | $3.42 \times 10^{11}$ |
| Polyhall | 9:.02 | 10 | 2.4 | 41 | .03 | $5.26 \times 10^{10}$ |
| Polyhall | 9:.01 | 10 | 2.6 | 38 | .04 | $5.87 \times 10^{10}$ |

COATINGS PREPARED IN ALL WATER SYSTEMS - COATED 1-SIDE
KRAFT PAPER UTILIZED WAS "LONGVIEW" KRAFT
TESTED AT 100 VOLTS FOR SURFACE RESISTIVITY

Other types of apparatus which may be utilizeable in the treating of previously manufactured stock paper for mass production of antistatic paper is for example, a wire wound rotatable rod of conventional well-known type, that could be rotatably mounted in the apparatus of FIG. 2 as a substitute for the squeeze rollers 50, 50a thereof, and which would be operative to generally evenly apply the antistatic liquid to the web of stock material being pulled from stock roll 40, for impregnation of the web. However, the general type of coacting powered, roller arrangement illustrated for instance in FIG. 2 may be preferred for mass production of the antistatic paper of the invention when utilizing previously manufactured rolls of paper stock material.

One advantage in connection with the manufacture of antistatic paper utilizing for instance the apparatus and process of the FIG. 1 type, is that building up of electrical charge on the paper web being emitted from the drier section after being treated with antistatic liquid, is prevented, and therefore arcing that conventionally occurs in paper manufacturing at the exit end of the drier, is eliminated, since any build up of charge on the web of antistatic paper is quickly dissipated to ground long before arcing can occur.

Figure 3:
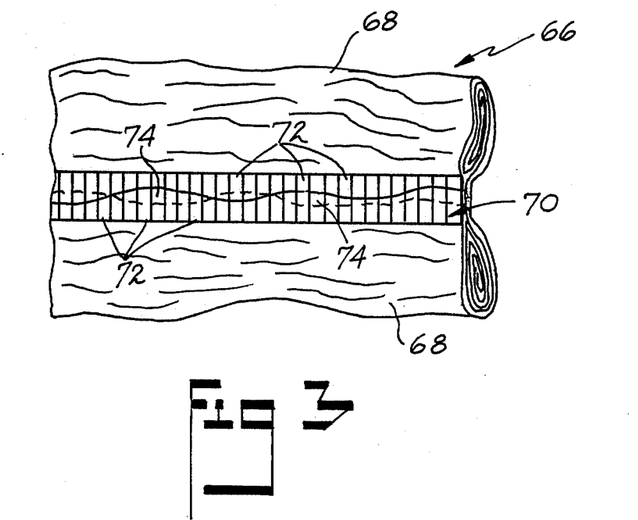
FIG. 3 is a fragmentary, enlarged, generally diagrammatic top plan view of a strip of pad-like cushioning dunnage product formed from antistatic paper produced from the processes of the present invention, and possessing the antistatic and voltage decay characteristics of the antistatic paper, and with the pad-like cushioning dunnage product being of generally known configuration, and having been produced on a known dunnage converter machine. The cushioning dunnage product illustrated comprises lateral, resilient, pillow-like portions and a central stitched or coined portion running lengthwise of the pad-like product, and connecting the pillow-like portions together.

FIG. 3 is a fragmentary, generally diagrammatic top plan view of a pad-like cushioning dunnage product 66 produced from the antistatic papers of this invention on a known cushioning dunnage converter mechanism, such as, for instance, disclosed in George Johnson U.S. Pat. No. 3,509,798 dated May 5, 1970 or the Ottaviano U.S. Pat. No. 4,026,198 dated May 31, 1977. Reference may be had to those patents for a complete disclosure and discussion of the construction and operation of dunnage paper converters, and the production of a pad-like cushioning dunnage product having a configuration and construction generally similar to that of the cushioning dunnage product illustrated in FIG. 3 of the present application. U.S. patent application Ser. No. 792,313, filed Oct. 28, 1985, now U.S. Pat. No. 4,750,896, patented June 14, 1988, in the names of Komaransky and Armington, and entitled Method and Mechanism for Producing Cushioning Dunnage Product, discloses another type of converter mechanism for producing pad-like cushioning dunnage product of the general type illustrated in FIG. 3. The aforediscussed patents and patent application are incorporated herein by reference.

Referring again to FIG. 3, the latter illustrates a dunnage product 66 produced for instance on a converter as aforediscussed, and formed from antistatic paper of the type described in the present application, and thus possessing the electrical characteristics of the antistatic paper of this application.

Such paper dunnage product comprises a pad-like article for use for instance in packaging, formed from paper sheet or the like with the lateral edges of the sheet having been generally loosely rolled inwardly and forming radially crumpled pillow-like portions 68 defining the lateral extremities of the elongated pad, together with means 70 connecting the rolled confronting edges of the pillow-like portions together along the generally central portion of the pad-like article, lengthwise thereof. The connecting means in the embodiment illustrated comprises lengthwise spaced transversely extending coined portions 72 of the paper material which stitch together the rolled confronting edges of the pillow-like portions, the latter edges thus being disposed in generally random overlapped relation as at 74 along the central compressed and coined portion 70 of the pad-like article.

The laterally arranged pillow-like portions 68 of the pad-like article possess considerable resiliency, each being of a substantially greater thickness than the central coined connected portion 70.

The pad-like product 66 may be formed on any converter of the aforediscussed types, but preferably on the converter disclosed in aforementioned U.S. Ser. No. 792,313, which results in cushioning product of enhanced cushionability, and may utilize for instance a multi-ply (for instance a tri-ply) roll of nominal 30 pound antistatic paper sheet, with the roll being approximately 30 inches wide and formed of three superimposed generally equal width sheets of nominal 30 pound kraft paper, one or more of which is antistatic paper produced in accordance with the present invention.

The formed pad-like product 66 has a density of approximately 0.6 to 0.75 pounds per cubic foot when formed on a converter for instance, of the type of aforementioned U.S. Ser. No. 792,313, and with the cushioning and antistatic pad product being approximately 8½ to 9½ inches wide and with the pillow-like portions 68 being approximately 2 to 3½ inches thick, in the embodiment illustrated. Thus, such product provides not only cushioning protection to merchandise, but also provides for protecting merchandise, and as for instance electronic components, against electrical charge damage.

From the foregoing description and accompanying drawings it will be seen that the invention provides novel processes for the production of antistatic or static dissipative papers, and apparatus for performing such processes for mass production of the papers, and wherein the novel antistatic papers are useable in dunnage converters operable to produce a pad-like cushioning dunnage product which provides electrical charge protection as well as cushioning protection to merchandise.

The terms and expressions which have been used are used as terms of description and not limitation, and there is no intention in the use of such terms and expressions of excluding any equivalents of any of the features shown or described, or portions thereof, and it is recognized that various modifications are possible within the scope of the invention claimed.

We claim:

1. An antistatic or static dissipative sheet-like material for use in packaging comprising, a web of the sheet-like material which has been treated on at least one surface thereof with an antistatic material operable to facilitate the dissipation of static charge, said antistatic material utilizing a solution of a water soluble, non-cross linking antistatic polymer to form said antistatic material, said sheet-like material before being treated with said antistatic material possessing a porosity in the range of approximately 5 to approximately 25 sec./100 ml as measured on a Gurley densitometer to provide for said solution to penetrate said web and provide static control characteristics to said sheet-like material, said antistatic material being dried on said web and providing for said sheet-like material a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of said web.

2. A sheet-like antistatic material in accordance with claim 1 wherein said polymer is essentially an electroconductive quaternary ammonium polymer.

3. An antistatic or static dissipative paper for use in packaging and the like comprising, a web of paper which has been treated on at least one surface thereof with an antistatic material operable to facilitate the dissipation of static charge, said antistatic material utilizing a solution of a water soluble, non-cross linking antistatic polymer and a liquid carrier to form said antistatic material, said antistatic material impregnating and being dried on said web and providing for said paper a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of said web, said web before being treated with said antistatic material possessing a porosity in the range of approximately 5 to approximately 25 sec./100 ml as measured on a Gurley densitometer.

4. an antistatic paper in accordance with claim 3 wherein said polymer is essentially an electroconductive quaternary ammonium polymer.

5. An antistatic paper in accordance with claim 3 wherein said paper web consists of urea formaldehyde wet-strength unbleached, unsized, standard MF kraft paper possessing a porosity within said range.

6. An antistatic or static dissipative paper for use in packaging and the like comprising, a web of paper which has been treated on at least one surface thereof with an antistatic material operable to facilitate the dissipation of static charge, said antistatic material utilizing a solution of a water soluble, non-cross linking antistatic polymer and a liquid carrier to form said antistatic material, said antistatic material impregnating and being dried on said web and providing for said paper a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of said web, and wherein said polymer is essentially a water soluble polystyrene sulfonic acid.

7. An antistatic paper in accordance with claim 3 wherein said polymer on the treated web of paper is an electroconductive resin composition of approximately 0.5 pound or two pounds per 3,000 square feet of paper web per respective side surface when dried on said respective side surface.

8. An antistatic paper in accordance with claim 4 wherein said quaternary ammonium polymer is a 40% solution by weight of said polymer prior to mixing with said carrier.

9. An antistatic paper in accordance with claim 3 wherein said carrier is water.

10. An antistatic paper in accordance with claim 3 wherein said carrier comprises alcohol, such as methanol, ethanol or isopropanol.

11. An antistatic paper in accordance with claim 3 wherein said carrier consists essentially of a mixture of water and alcohol or other water miscible solvents.

12. An antistatic paper in accordance with claim 3 wherein said paper web is nominal 30 pound kraft paper possessing said porosity.

13. Paper dunnage product comprising a pad-like article for use in packaging, formed from paper web or the like with the lateral edges of the web having been generally loosely rolled inwardly and forming crumpled pillow-like portions defining the lateral extremities of said packaging article, and means connecting the rolled confronting edges of the pillow-like portions together along the generally central portion of the pad-like article, lengthwise thereof, the last mentioned means comprising transversely extending stitched portions of said confronting edges, the latter being in generally overlapped relation at said central portion, said laterally arranged pillow-like portions of said article possessing considerable resiliency, each being of a substantially greater thickness than said central connecting portion, and said web having been impregnated on at least one surface thereof with antistatic liquid material which is subsequently dried thereon and is operable to facilitate the dissipation of static charge, thus providing said product with electrical charge protection, as well as cushioning characteristics, said web before being treated with said antistatic material possessing a porosity in the range of approximately 5 to approximately 25 sec./100 ml as measured on a Gurley densitometer, and wherein said antistatic material utilizes a solution of a water soluble, non-cross linking antistatic polymer forming said antistatic material, said antistatic polymer being dried on said web prior to the formation thereof into said product and providing said product with a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of said product.

14. A paper dunnage product in accordance with claim 13 having a density of approximately 0.6 to 0.75 pounds per cubic foot when said product is formed of three superimposed paper webs of 30 pound kraft paper, one or more of which possessed a porosity within said range prior to having been treated with said antistatic material, and prior to formation of said superimposed webs into said product, and wherein each said web is approximately 30 inches in width prior to being rolled inwardly to form said product, said product being approximately 8½ to 9½ inches wide with said pillow-like portions each being approximately 2 to 3½ inches thick.

15. A process for the production of antistatic or static dissipative paper for use in packaging, comprising, providing a web of paper possessing a porosity in the range of approximately 5 to approximately 25 sec./100 ml as measured on a Gurley densitometer, applying a liquid antistatic mixture to at least one side surface of the paper, said antistatic liquid mixture consisting of a liquid carrier and a solution of antistatic material including a water soluble, non-cross linking polymer, drying said solution on said web and providing a packaging paper having on said one side surface thereof a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of the paper.

16. A process in accordance with claim 15 including providing said carrier in the form of essentially water.

17. A process in accordance with claim 15 including providing said liquid carrier as essentially a mixture of alcohol and water in the quantities by volume of approximately 50% alcohol and 50% water.

18. A process in accordance with claim 15 including providing said polymer in the form of essentially a quaternary ammonium compound.

19. A process in accordance with claim 15 including providing said polymer in the form of essentially a water soluble polystyrene sulfonic acid.

20. A process in accordance with claim 15 including moving the paper web at a rate of approximately 1,400 feet per minute into coaction with a pair of coacting, power driven rollers, and thence through a drier to accomplish said drying, with the latter comprising heated, rotatable drums maintained at approximately 240° F. to 260° F., with the paper web being engageable with said drums of the drier for up to three minutes at said rate of movement, and then winding the web into a roll for subsequent handling.

21. A process in accordance with claim 15 including providing the liquid antistatic material as essentially a quaternary ammonium compound and the liquid carrier as essentially water or essentially a combination of water and alcohol or other water miscible solvents.

22. A process in accordance with claim 15 which includes engaging the coated web with metal in said drier to prevent accumulation of static charge on said paper produced in said process.

23. A process for the production of antistatic or static dissipative sheet-like material for packaging, comprising, providing a web of the sheet-like material having a porosity within a range of approximately 5 to approximately 25 sec./100 ml as measured on a Gurley densitometer, applying a liquid antistatic mixture to at least one side surface of said web, said antistatic mixture utilizing a solution of a water soluble non-cross linking polymer, causing said mixture to penetrate said web, drying said impregnated web, and resulting in the sheet-like material having electrical characteristics comprising a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding thereof.

24. A process in accordance with claim 23 wherein said electrical characteristics are retained by said sheet-like material over a relatively long time period such as for instance at least 9 to 12 months.

25. A process in accordance with claim 23 including subjecting said web to a drier mechanism to accomplish said drying thereof, and contacting said dried web with a metallic path to ground and thus eliminating any arcing of electrical charge from said dried web upon emission thereof from said drier mechanism.

26. An antistatic or static dissipative sheet-like material for use in packaging comprising, a web of the sheet-like material which has been treated on at least one surface thereof with an antistatic material operable to facilitate the dissipation of static charge, said antistatic material utilizing a solution of a water soluble, non-cross linking antistatic polymer to form said antistatic material, said sheet-like material being sufficiently porous to allow said solution to penetrate said web and provide static control characteristics to said sheet-like material, said antistatic material being dried on said web an providing for said sheet-like material a surface resistivity in the range of approximately $1 \times 10^5$ ohms per square to $1 \times 10^{12}$ ohms per square at a relative humidity of no greater than approximately 15% or less, and a maximum volage decay time of approximately two seconds or less at no greater than approximately 15% or less relative humidity for approximately 5,000 applied volts to technical zero volts, upon grounding of said web, and wherein said polymer is essentially a water soluble polystyrene sulfonic acid.

27. A sheet-like material in accordance with claim 1 wherein said polymer is essentially an electroconductive combination of ammonium or other inorganic salts and surfactants.

28. A process in accordance with claim 15 including providing said polymer in the form of essentially a water soluble polystyrene sulfonic acid, and providing the liquid carrier in the form of essentially water or a combination of essentially water and alcohol or other water miscible solvents.

29. A process in accordance with claim 15 including providing said polymer in the form of essentially an electroconductive combination of ammonium or other inorganic salts and surfactants, and providing the liquid carrier in the form of essentially water or essentially a combination of water and alcohol or other water miscible solvents.

30. An antistatic or static dissipative sheet-like material for packaging, comprising, a web of the sheet-like material which has been treated on at least one surface thereof with a liquid antistatic material operable to facilitate the dissipation of static charge, said antistatic material utilizing a soluion of a water soluble, non-cross linking antistatic polymer to form said antistatic material, said sheet-like material prior to its being treated with said antistatic material having a porosity within the range of about 5 to about 25 sec./100 ml as measured on a Gurley densitometer, to allow said solution to penetrate said web and provide static control characteristics to said treated sheet-like material, said antistatic material being dried on said web and providing for said treated sheet-like material an electroconductive resin composition of approximately one pound to approximately four pounds per 3,000 square feet of said treated sheet-like material, said antistatic or static dissipative sheet-like material having a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of said treated sheet-like material.

31. An antistatic paper in accordance with claim 7 wherein the stated electrical characteristics of said paper are retained by said paper in storage for at least nine to twelve months, thus providing said paper with long shelf life.

32. A process in accordance with claim 15 wherein the carrier consists essentially of water and the solution of antistatic material includes a quaternary ammonium compound, and including the step of first producing the web on a paper making macine and drying the produced web from the paper making machine so that it possesses a moisture content of between approximately 5% to 10% by weight prior to said applying of said liquid antistatic mixture thereto, and then performing said step of applying said liquid antistatic mixture to said web, said step of drying said solution on said web being accomplished by passing the web with said antistatic mixture applied thereto about and in engaged relation with heated rotatable drums to produce the dried antistatic paper web, and including a step of winding the last mentioned dried paper web into roll form for subsequent handling.

33. An antistatic or static dissipative paper for use in packaging and the like comprising, a web of paper which has been treated with an antistatic material operable to facilitate the dissipation of static charge, said antistatic material utilizing a solution of a water soluble, non-cross linking antistatic polymer, and a liquid carrier, to form said antistatic material, said antistatic liquid material impregnating and being dried on said web and providing said wweb with a surface resistivity in the range of approximately $1 \times 10^5$ ohms per square to $1 \times 10^{12}$ ohms per square at a relative humidity of no greater than approximately 15% or less, and a maximum voltage decay time of approximately two seconds or less at no greater than approximately 15% or less relative humidity for approximately 5,000 applied volts to technical zero volts, upon grounding of said web, said polymer consisting of an electroconductive quaternary ammonium polymer, said web of paper possessing a porosity in the range of approximately 5 to approximately 25 sec./100 ml as measured on a Gurley densitometer before being treated with said antistatic material, said quaternary ammonium polymer consisting of a forty percent solution by weight of said polymer prior to its being mixed with said carrier, and wherein said carrier consists essentially of water, said web being urea formaldehyde wet strength unbleached, unsized, nominal 30 pound kraft paper possessing a porosity within said range, before being treated with said antistatic material, said antistatic material upon being dried on said web, providing an electroconductive resin composition on said web of between approximately one pound to approximately four pounds per 3,000 square feet of said web.

34. A process in accordance with claim 32 wherein said application of said liquid antistatic mixture to the web comprises passing the web through a pool of the liquid antistatic mixture at a rate of approximately 1400 feet per minute and thence between a pair of coacting power driven rollers, and wherein the heated rotatable drums for drying said solution on the web are maintained at between approximately 240 degrees Fahrenheit to 160 degrees Fahrenheit, with the web being engagable with the drums for up to three minutes, and then accomplishing said step of winding the dried web into a roll form for subsequent handling, and wherein the produced web from the paper making machine is urea formaldehyde wet strength unbleached, unsized, standard MF kraft paper of nominal 30 pound weight possessing a porosity within a range of about 5 to about 15 sec./100 ml as measured on a Gurley densitometer, before being treated with the liquid antistatic mixture.

35. An antistatic or static dissipative paper in accordance with claim 33 which possesses a volume resistivity of less than $1 \times 10^{11}$ ohms-centimeter.

36. A sheet-like material in accordance with claim 3 wherein said polymer is essentially an electroconductive combination of ammonium or other inorganic salts and surfactants.

37. A process in accordance with claim 23 wherein said applying of the liquid antistatic mixture to the web comprises passing the web through a pool of the liquid antistatic mixture.

38. A process in accordance with claim 37 including passing said web between a pair of coacting rollers after passing through said pool of antistatic mixture.

39. An antistatic or static dissipative packaging paper produced by the process of claim 15.

40. An antistatic or static dissipative sheet-like material produced by the process of claim 23.

41. A paper dunnage product in accordance with claim 13 wherein said polymer consists essentially of a quaternary ammonium compound.

42. A paper dunnage product in accordance with claim 13 wherein said polymer consists essentially of a water soluble polystyrene sulfonic acid.

43. A paper dunnage product in accordance with claim 13 wherein said polymer consists essentially of an electroconductive combination of ammonium or other inorganic salts and surfactants.

44. A paper dunnage product in accordance with claim 13 wherein said polymer on the impregnated web consists of an electroconductive resin composition of essentially a quaternary ammonium compound, and of approximately 0.5 pound to two pounds per 3,000 square feet of web per respective side surface thereof when dried on said respective side surface.

45. A process in accordance with claim 23 including applying said antistatic mixture to at least said one side surface of said web in an amount resulting upon drying of said mixture on said web of an amount of said polymer in a range of approximately 0.5 pound to approximately two pounds per 3,000 square feet of web per respective said side surface thereof.

* * * * *